United States Patent [19]

Cotsworth

[11] 4,299,204

[45] Nov. 10, 1981

[54] SOLAR COLLECTOR

[76] Inventor: John L. Cotsworth, 11 Lake Rd., Short Hills, N.J. 07078

[21] Appl. No.: 152,337

[22] Filed: May 21, 1980

[51] Int. Cl.³ .............................. F24J 3/02; F28F 1/32
[52] U.S. Cl. .................................. 126/447; 126/448; 126/450; 165/171
[58] Field of Search ............... 126/417, 446, 447, 448, 126/450; 165/178, 172, 171

[56] References Cited

U.S. PATENT DOCUMENTS

| | | | |
|---|---|---|---|
| 3,952,725 | 4/1976 | Edmondson | 126/447 |
| 4,076,026 | 2/1978 | Copping | 126/448 |
| 4,108,159 | 8/1978 | Wendel | 126/448 |
| 4,112,921 | 9/1978 | MacCracken | 126/448 |
| 4,112,922 | 9/1978 | Skinner et al. | 126/448 |
| 4,120,228 | 10/1978 | Barrett | 126/447 |
| 4,120,283 | 10/1978 | Eder | 126/448 |
| 4,120,287 | 10/1978 | Marles et al. | 126/447 |
| 4,124,292 | 11/1978 | Van Wandelen | 355/70 X |
| 4,124,292 | 11/1978 | Van Wandelen | 355/70 X |
| 4,136,945 | 1/1979 | Stephens | 355/14 |
| 4,143,643 | 3/1979 | Gerin et al. | 126/448 |
| 4,159,017 | 6/1979 | Novi | 126/448 |
| 4,215,676 | 8/1980 | Gilliam | 126/448 |

FOREIGN PATENT DOCUMENTS

| | | | |
|---|---|---|---|
| 1539468 | 1/1979 | United Kingdom | 355/70 |
| 2017946 | 10/1979 | United Kingdom | 355/70 |
| 1539468 | 1/1979 | United Kingdom | 355/70 |
| 2017946 | 10/1979 | United Kingdom | 355/70 |

Primary Examiner—Daniel J. O'Connor
Attorney, Agent, or Firm—Norman N. Popper; Daniel H. Bobis

[57] ABSTRACT

A solar collector wherein heat transfer from a plate to a tube grid is accomplished by the intimate engagement of the tube grid with the plate by compression and without any physical union by bonding; a light transparent sheet presses the two together against a compressible pad and the tube grid and plate are not bonded together but only held in intimate contact by compressive engagement.

3 Claims, 3 Drawing Figures

SOLAR COLLECTOR

BACKGROUND OF THE INVENTION

1. Field of the Invention

This invention generally relates to solar collectors and specifically to solar collectors wherein a plate of heat absorbent material is disposed in intimate engagement with a tube grid by compression but without any bonding or soldering of the two together.

2. Prior Art

With the rising cost of fossil fuels, attention is being directed to the utilization of solar energy. Numerous heat exchange devices have been created wherein the sun's rays are applied to the elevation of temperature of various fluids. In many of these devices, a tube grid is utilized for containing fluids and liquids capable of having their temperature raised and such tube grids are disposed in contact with an absorber plate. The tube grid is maintained in intimate engagement with the absorber plate often by a bonding operation wherein solder causes the intimate adherence of the one to the other. The use of welding or adhesives has also occurred. Such practices increase the cost of the solar collector by reason of the labor and materials utilized in bonding. There are further disadvantages in bonding or soldering in that flux residues may remain on the absorber plate or be entrapped in the fluxes and cause the deterioration of the solder bond as well as the absorber plate and the tube grid. High temperature may accomplish differential expansion. As a result, the tube grid and the absorber plate may become detached from one another, destroying the intimate contact. Temperatures of over 600° Farenheit are not unknown. Welding involves subjecting the parts to even higher temperatures and often results in warpage or distortion of the absorber plate, requiring a straightening of the plate and producing an unattractive appearance. If the absorber plate has applied to it, a coating to enhance the absorption of the sun's heat rays, such a coating may be impaired by bonding or soldering or welding. Sonic welding also causes the delamination of preapplied coatings. Electrodeposition is another means of applying coatings that enhance absorption of the sun's rays. Black chrome dress on an absorber plate may cause the entrapment of cleaning and plating solutions and greatly reduce long term durability. Mechanical clips are often made of different metals than the absorber plate. When such different metals are brought together by welding or soldering or other means, galvanic action may result in rapid deterioration and detachment. Such clips may be dimensionally misapplied or may become loose due to thermal expansion and contraction of the different metals, thus impairing the intimate contact of the tube grid with the absorber plate. In many of these methods, handling costs are increased. The increased cost of other methods becomes justified by reason of permanence.

SUMMARY OF THE INVENTION

It has been found that a solar collector can be fabricated wherein the tube grid and the collector plate are intimately engaged with each other persistently and uniformly by compression. By this means, the cost of fabrication is significantly reduced because there is no longer a bonding, soldering or welding operation necessary to join the tube grid and tube plate. There is the further advantage in that flux residues are no longer present and do not contribute to corrosive impairment. High temperatures involved in welding tube sheets with tube plates are not resorted to so that there is no destruction of preapplied coatings which may be utilized to enhance heat absorption. High temperature, soldering or welding not being utilized, does not cause any warpage or distortion of absorber plates and the cost of straightening in order to avoid an unattractive rippled appearance is no longer necessary. Since sonic welding as an alternative is not resorted to, the preapplied coatings are not impaired. Electrodeposited black chrome is unimpaired by cleaning and plating solutions which have to be neutralized otherwise durability is drastically reduced. In the case of the present invention, bonding of mechanical clips is no longer required and so corrosion failure is not a factor. Nor is it a factor that such clips may be misapplied or become loose due to thermal differential contraction and expansion. Lower assembly costs in more conventional methods may offset slightly increased fabrication costs but the superior permanence of the product overcomes this disadvantage.

The present invention utilizes strips which have considerable effect to block convection and thus reduce heat losses. Thermal efficiency is higher in the present collector. A vastly improved efficiency of the solar collector is thus achieved.

THE DRAWINGS

These objects and advantages as well as other objects and advantages may be attained by the device shown by way of illustration in the drawings in which:-

PREFERRED EMBODIMENT

Figure 2:
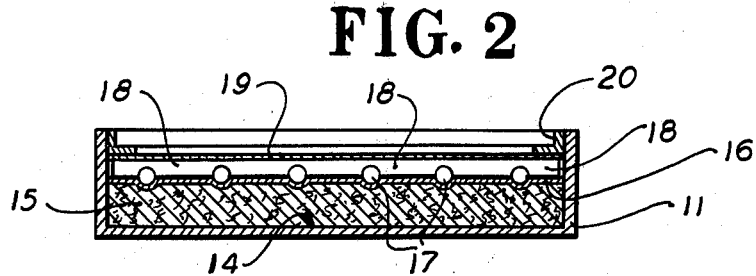
FIG. 2 is a vertical longitudinal cross-sectional view of the assembly.
Figure 3:
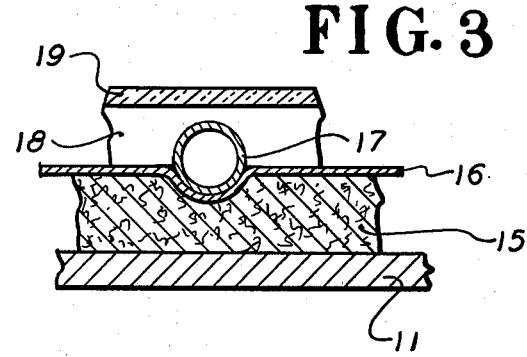
FIG. 3 is an enlarged, longitudinal cross-sectional view of a portion of the assembly.
Figure 1:
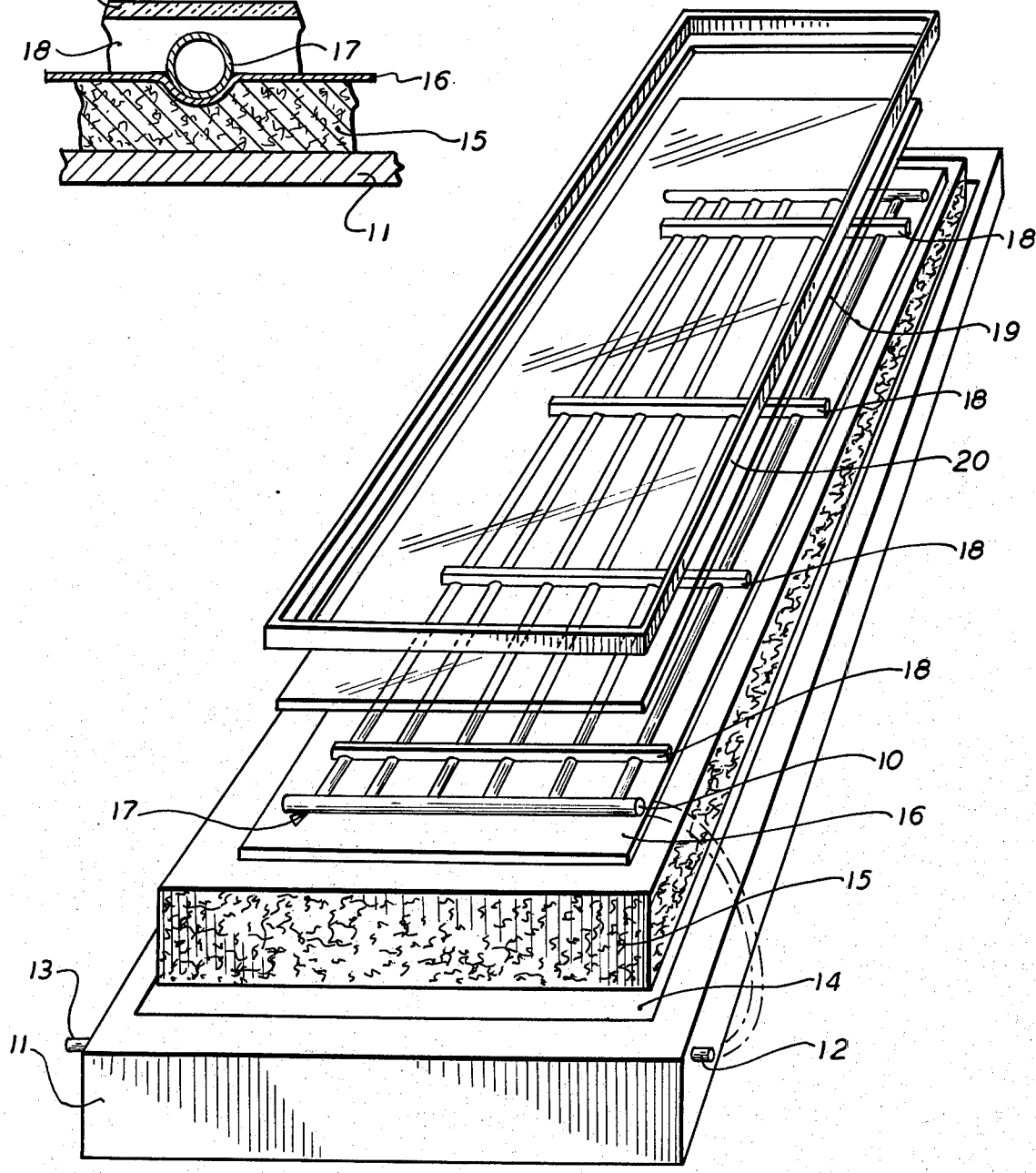
FIG. 1 is a perspective view of the elements of the collector spacially displaced from one another.

The solar collector with a tube grid compressively engaged with an absorber plate provides a hollow collector 11 which may generally take the shape of an elongated rectangle. Numerous other shapes are also acceptable but the elongated rectangle is preferred because of the free circulation of fluids therein and the ease with which it may be adapted to be positioned in various locations. The collector plate is provided with an intake port 12 for receiving fluids that have obtained an elevated temperature in a tube grid which will be hereinafter referred to. The collector also has an outlet port 13. At the top of the collector 11, a cavity 14 is formed in the top wall and the cavity 14 is dimensioned to receive a pad 15. This pad 15 is made of semirigid compressible material 15 that lies in the cavity 14. A plate 16 of heat absorbent material is disposed on the pad 15. A tube grid 17 is positioned on the plate 16. The tube grid consists of a plurality of longitudinal hollow rods which at each end intersect with a header 10 so that liquids in the tube grid may circulate through the header, into the individual tubes, and out the opposite end into the opposite header. The tube grid 17 being disposed upon the plate 16 is in intimate heat exchange relation to it so that the absorption of the sun's rays by the plate 16 enables heat exchange with the plate 16 and produces a rise in temperature of any liquid contained in the tube grid 17. The pad 15, the plate 16 and the tube grid 17 are so dimensioned as to lie in the cavity 14.

Immediately above the tube grid 17, a plurality of transverse strips 18 are placed over the individual longitudinal tubes of the tube grid 17. These strips have generally arcuate indentations in registration with the individual tubes. The strips 18 lie over the tubes spaced away from each other generally a uniform distance from each other. The length of the strips 18 is such that they are within the collector 11. The strips 17 perform the function of holding down the tube grid 17 in intimate relationship with the underlying plate 16 of heat absorbent material. A sheet 19 overlies the strips 18 and fits within the cavity 14. Pressure applied to the sheet ensures the close and intimate engagement of the tube grid 17 with the underlying plate 16 which is pressed into close engagement with the plate 16 by the strips 18. Thus the strips 18 are normally urging the tube grid 17 into intimate engagement with the plate 16. The sheet 19 is made of glass or some other material readily pervious to the rays of the sun so that the heat thereof is not restrained from passage through the sheet 19 and reaches the tube grid 17 and the plate 16. A frame 20 is provided. It is generally rectangular in shape and is dimensioned to fit into the collector 11 and engage the sheet 19 in such a manner as to press against the strips 18. By virtue of the engagement of the frame 20 with the sheet 19, the strips 18 engage the tube grid and press it into firm engagement with the plate 16. This causes the plate 16 to engage the compressible pad 15 which urges the plate 16 to hold in tight engagement with the tube grid 17. This accomplishes a relationship for efficient heat exchange between the tube grid 17 and the plate 16. The intake port 12 on the hollow collector is connected to the header of the tube grid 17 to receive the effluent from the tube grid. In this manner, the hollow collector receives the liquid from the tube grid 17 and holds the liquid at the elevated temperature for use by dispensing. Respecting the various materials, Fiberglas and certain types of mineral wool, possess consistent resilience and durability over long periods of elevated temperature and are suitable for constructing the pad 15. Compressive engagement of the tube grid by the strips 18 holding the tube grid 17 against the plate 16 but without any bonded contact, soldering or welding avoids the breakage of contact and ensures continuous contact and efficiency. Since there is no movement of the one with respect to the other, no breakge of bonds occurs. The unwarped character of the plate 16 ensures neat appearance. Surface finishes are applied to the tube grid 17 and the plate 16 to ensure the ready absorption of the heat from the sun's rays. These elements may be finished separately or together with the same surface finish or several different surface finishes, depending upon the election of the manufacturer respecting operating temperatures and results desired. The usual method of applying a surface dress is by spray painting. Surface deposition may be by painting or electrodeposition. Contact between the tube grid 17 and the plate 16 in this device by mere compression is as effective as thin-line solder joints. The plate 16 may be generally in the range of .003" to 0.016". In the range of 0.005" to 0.010", this thickness for the plate 16, the use of one-quarter to one-half hard aluminum or copper has proved to be the most effective where the collector 11 is ten feet in length.

This construction provides a highly efficient and durable solar collector.

What is claimed is:

1. A solar collector with a tube grid for the passage therethrough of a heat exchange fluid, in compressive engagement with an absorber plate, comprising:
   (a) a hollow collector housing having an intake and an outlet port for said heat exchange fluid, and comprising a broad floor surface and at least one upstanding wall defining a cavity;
   (b) a pad of semi-rigid, compressible material disposed in said cavity adjacent said floor surface;
   (c) a plate of heat absorbent material disposed upon said pad;
   (d) a tube grid for said heat exchange fluid disposed upon said plate, said tube grid defining an inlet end and an outlet end, said inlet end and said outlet end in corresponding fluid communication with said intake port and said outlet port;
   (e) a plurality of strips disposed upon said tube grid, said strips having a first adjacent surface resting on said grid, and a second opposed surface removed therefrom;
   (f) a ray-pervious sheet disposed above said tube grid and resting upon the opposed surfaces of said strips;
   (g) a frame disposed upon said sheet and fastened to said wall to exert compressive force on said sheet to urge said sheet, said strips, said tube grid and said plate into compressive, intimate engagement with each other and with said pad to provide uniform thermal registry between said tube grid and said plate.

2. A solar collector according to claim 1 in which the tube grid consists of a plurality of longitudinally disposed tubes communicating at each end with a header.

3. A solar collector according to claim 1 in which the plurality of strips are disposed transversely with respect to the tube grid, have a plurality of notches therein in registration with the tubes of the tube grid whereby the strips hold the tube grid in intimate engagement with the plate.

* * * * *